May 30, 1950 V. C. WESTCOTT 2,509,792

BLOCKING OSCILLATOR TRIGGER CIRCUIT

Filed May 17, 1946

INVENTOR
VERNON C. WESTCOTT
BY Elmer J. Gorn
ATTY.

UNITED STATES PATENT OFFICE 2,509,792

BLOCKING OSCILLATOR TRIGGER CIRCUIT

Vernon C. Westcott, Lincoln, Mass., assignor to Raytheon Manufacturing Company, Newton, Mass., a corporation of Delaware Application May 17, 1946, Serial No. 670,381

3 Claims. (Cl. 250—27)

This invention relates to electrical circuits, and more particularly to a circuit for triggering a blocking oscillator.

An object of the invention is to devise a circuit by means of which a blocking oscillator pulse may be initiated from a source of sine waves, thereby insuring the production of evenly spaced pulses by said oscillator.

Another object is to provide a means for triggering a blocking oscillator, which means will be effectively open-circuited when said oscillator is triggered so as not to load said oscillator during its pulse.

A further object is to provide a means for triggering a blocking oscillator which will not require a large amount of current.

A still further object is to devise a means for triggering a blocking oscillator, which means will serve to prevent more than one-half oscillation of said oscillator after it is first pulsed.

Figure 1:
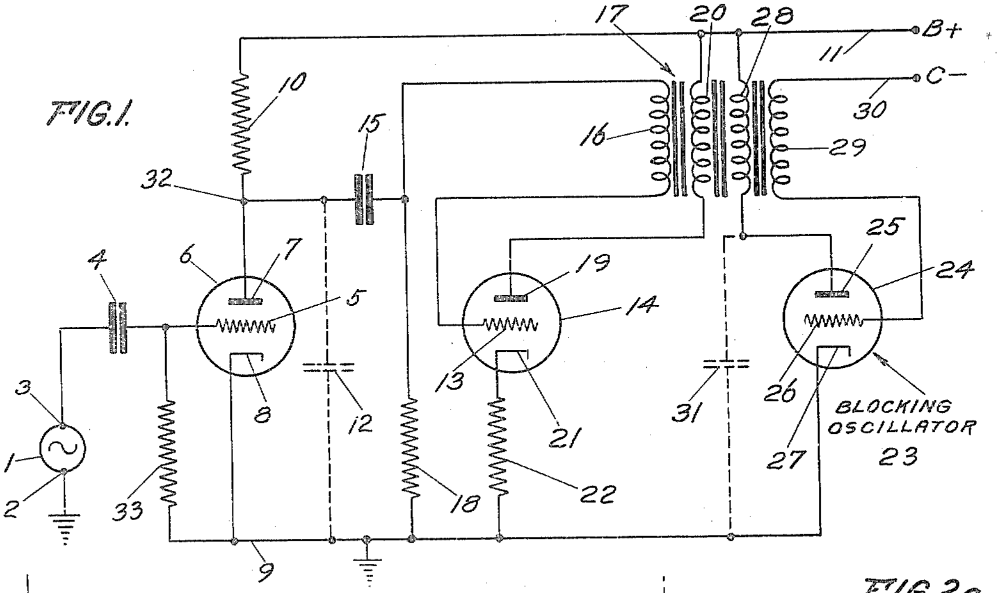
Figures 2A, 2B:
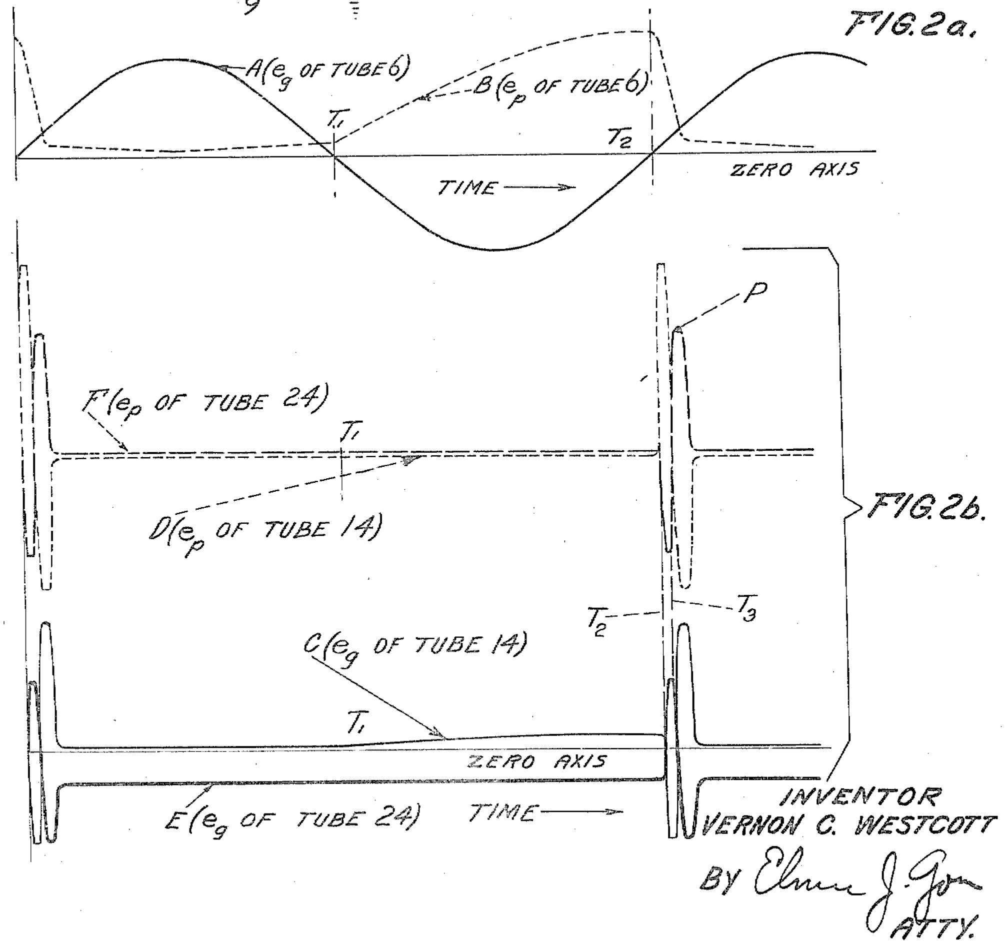

The foregoing and other objects of the invention will be best understood from the following description of an exemplification thereof, reference being had to the accompanying drawing, wherein:

Fig. 1 is a diagrammatic representation of one means for carrying out the invention; and Figs. 2*a*–2*b* show a set of curves representing various voltages existing in the system.

A source of sinusoidal waves 1 has one terminal 2 thereof grounded and its other terminal 3 connected through a condenser 4 to the grid 5 of an electron discharge device 6 which also includes an anode 7 and a cathode 8. Leak resistor 33 is connected from the grid side of condenser 4 to grounded lead 9. The cathode 8 is connected to lead 9 and may be brought to the temperature of thermionic emission by any suitable heating means (not shown). Anode 7 is connected through a high resistance 10 to the positive high-potential supply lead 11. The capacitance 12 shown in dotted lines between anode 7 and cathode 8 represents the distributed or stray capacitance of the leads and the inter-electrode capacitance of tube 6. Resistor 10 has such a value that the time constant of the R. C. circuit 10, 12 is a large fraction of the time required for one cycle of source 1.

Anode 7 is coupled to grid 13 of electron discharge device 14 through a coupling capacitor 15 and the winding 16 of a transformer 17. A leak resistor 18 is connected to grounded lead 9 from the grid side of capacitor 15. Anode 19 of tube 14 is connected to supply lead 11 through winding 20 of transformer 17, while cathode 21 of tube 14 is connected to grounded lead 9 through a resistor 22.

A blocking oscillator 23 includes an electron discharge device 24 having an anode 25, a grid 26, and a cathode 27. Anode 25 is connnected through winding 28 of transformer 17 to supply lead 11, while cathode 27 is connected directly to grounded lead 9. Grid 26 is connected through winding 29 of transformer 17 to a lead 30, which supplies negative voltage of a value sufficient for cutoff of tube 24 to said grid. The capacitance 31 shown in dotted lines between anode 25 and cathode 27 represents the distributed or stray capacitance of the leads and the interelectrode capacitance of tube 24.

In operation, sinusoidal waves with an amplitude of more than the cutoff bias voltage of tube 6 are applied to grid 5 thereof from source 1, these waves being represented as curve A in Fig. 2*a*. Curve B of Fig. 2*a* represents the variation of plate voltage of tube 6 with time. As the grid voltage of tube 6 goes negative, as at point $T_1$ of Figs. 2*a* and 2*b*, the plate voltage of tube 6 rises due to the decrease of plate current therein, as shown by curve B, effectively charging capacitance 12. The plate voltage B rises rather slowly because of the long time constant of the R. C. circuit 10, 12. As grid 5 is driven positively by source 1 at time $T_2$, tube 6 becomes conducting and capacitance 12 is effectively discharged rapidly therethrough so that the plate voltage of tube 6 falls very rapidly beginning at this time (see curve B). The plate voltage B remains at a low value until the next negative half-cycle on the grid 5, at which time the above variations are repeated.

It is to be understood that the curves of Figs. 2*a* and 2*b* do not represent the actual quantitative values of the voltages, but they do represent in a general way the qualitative variations of the voltages with time.

Curve C of Fig. 2*b* represents the variation of the voltage on grid 13 of tube 14 with time. Condenser 15 has a rather large value of capacitance. At time $T_1$, as the plate voltage B of tube 6 beings to rise, condenser 15 will begin to charge from the source through resistors 10 and 18, the flow of charging current through resistor 18 producing a voltage drop therein which is in such a direction as to cause the potential of grid 13 to rise relative to its cathode, as shown by curve C. Since the condenser 15 has a large capacitance value, it will require a considerable time to become fully charged, so that the grid voltage C will continue to increase during the time that plate voltage B is rising. At time $T_2$, when tube 6 becomes conducting, point 32, which is connected to the left-hand (positively-charged) plate of condenser 15, is connected to grounded lead 9 through the low resistance of said tube. Lead 9 is also connected to cathode 21, so that substantially the entire potential of condenser 15 is applied to grid 13, making the grid voltage C go highly negative at this time $T_2$.

Curve D represents the variation of the plate voltage of tube 14 with time. At time $T_1$, grid voltage C of tube 14 begins to increase, as stated above, but this increase takes place relatively slowly because of the large time constant of RC circuit 15, 18. During the time between $T_1$ and $T_2$, while plate voltage B of tube 6 is rising and while grid voltage C of tube 14 is therefore also rising, plate voltage D of tube 14 remains substantially constant for the following reasons. One reason is the existence of grid current, as grid 13 goes positive, which charges condenser 15, thus subtracting from the total plate current and therefore decreasing the total change in plate voltage which might occur. Another reason is the negative feedback from resistor 22, which increases in amount as the plate current of tube 14 increases. Also, the inductance of winding 16 is low, so that the grid current flowing therethrough induces no appreciable voltage in winding 20 connected to plate 19 of tube 14. At time $T_2$, as stated above, grid voltage C of tube 14 is driven highly negative, so that the plate current of tube 14 is suddenly cut off. As a result of this sudden cessation of plate current, the plate voltage D of tube 14 will suddenly increase.

Windings 16, 20, 28 and 29 of transformer 17 are all tightly coupled to each other. Windings 20 and 29 are so related that, when the plate voltage of tube 14 increases, the current change in winding 20 is in such a direction as to cause a positive voltage to be induced in winding 29, which positive voltage is applied to grid 26 of blocking oscillator 23 to drive said grid positively. Curve E represents the variation of the voltage of grid 26 with time. During most of the cycle of wave A, grid voltage E remains at the cutoff value for tube 24, due to the high negative grid bias supplied from lead 30. When plate voltage D increases at time $T_2$, the grid voltage E of tube 24 goes suddenly positive, as a result of the inductive coupling of windings 20 and 29. Curve F represents the plate voltage of tube 24. At time $T_2$, when grid voltage E goes positive, the plate current of tube 24 increases, so that plate voltage F drops and most of the voltage of the B-battery source appears across winding 28. Since at time $T_2$, when grid voltage C goes negative, the maximum plate current is flowing through tube 14 because of the relatively high value of positive grid voltage C, it will be appreciated that the stoppage of this current will cause a pulse of large amplitude to be applied to the grid 26 of the blocking oscillator 23, sufficient to make grid voltage E go positive.

Windings 28 and 20 are so related that, when the plate voltage F of tube 24 goes down, the plate voltage D of tube 14 will go up due to the voltage induced in winding 20 as a result of the change of current in winding 28. This increase of plate voltage D at time $T_2$ is a result both of the grid voltage C going negative at this time, as described above, and the voltage induced in winding 20 from winding 28. This increase of plate voltage D at time $T_2$ might tend to make tube 14 conducting, even though the grid voltage C of said tube is negative at this time due to the pulse applied thereto from tube 6, because the change of plate voltage D tends to be more rapid than the change of grid voltage C due to the pulse applied to said grid from tube 6. Therefore, winding 16 is provided on transformer 17, and it is related to winding 28 in such a way that when the plate voltage F of tube 24 goes down at time $T_2$, a voltage is induced in winding 16 and applied to grid 13 to drive grid voltage C negative at least as fast as the plate voltage D goes up. Because this is done, tube 14 will be maintained non-conducting during the time ($T_2$ to $T_3$) in which plate voltage F is at a low value, which time may be termed the "pulse." Therefore, tube 14, which is in effect connected across the blocking oscillator, because of the inductive relationship of windings 20 and 29, is prevented from damping or loading said oscillator at this time, which it would do, if it were conducting, by providing a path of low resistance across said oscillator.

Under the conditions existing at time $T_2$, when grid voltage E is positive, tube 24 is highly conducting, its plate voltage F is low, and most of the voltage of the B-battery source appears across winding 28 as $$\frac{di}{Ldt}$$

The current through inductance 28, between times $T_2$ and $T_3$ while tube 24 is highly conducting, is made up of two components, (1) a large constant resistive component as a result of the coupling of windings 29 and 28, because of loading due to grid current in blocking oscillator tube 24, and (2) a relatively small linearly-rising component caused by the $$\frac{di}{Ldt}$$

voltage in inductance 28. The resistive component alone would produce a rectangular pulse between times $T_2$ and $T_3$, and since this component is so much larger than the $$\frac{di}{Ldt}$$

component, the plate voltage F is substantially constant or horizontal between times $T_2$ and $T_3$. Due to the tight coupling of the windings of transformer 17, voltages C, D, and E are also substantially flat-topped between times $T_2$ and $T_3$. The current through winding 28 and tube 24 continues to rise (grid voltage E being highly positive at this time), beginning at time $T_2$, until tube 24 reaches the saturation point at time $T_3$. At this saturation point, the current through inductance 28 stops increasing, so that the $$\frac{di}{Ldt}$$

drop in said inductance falls to zero, causing grid voltage E to start falling and plate voltage F of tube 24 to start rising, due to the inductive relation of windings 28 and 29. As the grid voltage falls, a region is soon reached where the $g_m$ (the mutual conductance, or grid-plate transconductance) of tube 24 is high, so that the plate current, and therefore also the plate voltage, change very rapidly. In this region plate voltage F rapidly increases and grid voltage E rapidly decreases.

At time $T_3$, grid voltage C and plate voltage D have shapes which are substantially similar to those of plate voltage F, due to the tight coupling of windings 16, 20, 28 and 29. As plate voltage F rises, the interelectrode capacitance 31 of tube 24, which is effectively in series with winding 28, tends to become charged to limit the further rise of plate voltage, since at this time the tube 24 is substantially non-conducting because of its negative bias (see curve E, which shortly after time $T_3$ goes negative). When capacitance 31 has become charged, the current through inductance 28 reverses because of the inherent properties of a resonant circuit such as 28, 31. This reversal of current drives plate voltage F downwardly starting at point P. The plate voltage D of tube 14 is driven downwardly at the time $T_3$, due to the change of current through winding 28 produced by the increasing plate voltage F, since windings 28 and 20 are inductively coupled. At the same time $T_3$, grid voltage C is driven upwardly, again due to the change of current through winding 28 produced by the increasing plate voltage F, and due to the coupling of windings 28 and 16. The reversal of current through inductance 28, after capacitance 31 becomes charged, also causes the grid voltage E of tube 24 to turn upwardly from its maximum negative value.

When plate voltage F is driven downwardly beginning at point P, plate voltage D begins to increase, and, as it does so (grid voltage C decreasing but being still positive at this time), a point is reached at which tube 14 becomes conducting. Windings 28 and 20, in series, have little or no inductance. When tube 14 is conducting, a low resistance path, consisting of windings 28 and 20 in series with the anode-cathode path of tube 14 and resistor 22, is provided across capacitance 31. Therefore, capacitance 31 is rapidly discharged after it has become charged, so that further charging and discharging of the capacitance by oscillatory currents through inductance 28 and capacitance 31 is prevented.

After the point of inflection P on plate voltage curve F is passed, due to the clipping or damping action of tube 14, as explained above, plate voltage F returns to the value it had prior to time $T_2$, which is the steady value supplied from lead 11, because grid voltage E returns to the cutoff value supplied from lead 30. Voltages E and F remain at these values until the next time corresponding to time $T_2$ is reached in the cyclic variation of grid voltage A, at which time the above-described variations are repeated. The next time is a whole cycle of wave A after time $T_2$.

Shortly after point P, grid voltage C and plate voltage D return to their original values (that is, the values which they had prior to the time $T_1$) because of the return of plate voltage F to its original value, at which value the current in winding 28 is no longer changing, so that voltages can no longer be induced in windings 16 and 20. These voltages C and D remain at their "original" values until the next time corresponding to time $T_1$ is reached in the cyclic variation of grid voltage A, at which time, due to the increase of plate voltage B, grid voltage C begins to increase as before.

The time required for the blocking oscillator to be triggered and thereafter to become blocked, as will be seen from an examination of Figs. 2*a* and 2*b*, is much less than the time required for one half-cycle of the sinusoidal wave A, so that there will be ample time for tube 14 to be returned to a nonconducting condition before the next time corresponding to time $T_1$ is reached on wave A. The blocking oscillator 23 is triggered once during each cycle of the sinusoidal source, at times corresponding to $T_2$ on voltage wave A, at the same time in each cycle. Since the frequency of source 1 may be very accurately controlled, the "pulses" produced by blocking oscillator 23 will be very evenly spaced. Tube 6 is not required to carry a large current, because of the presence of high resistance 10. The average current through tube 6 will be small, even though a high amplitude pulse is ordinarily necessary to trigger a blocking oscillator of this type.

Of course, it is to be understood that this invention is not limited to the particular details as described above, as many equivalents will suggest themselves to those skilled in the art. For example, an actual condenser may be used to replace the stray capacitance 12 in Fig. 1. Various other variations will suggest themselves.

What is claimed is:

1. A circuit of the character described, comprising an electron discharge tube having at least anode, cathode, and grid elements, a blocking oscillator having input and output elements, said oscillator being adapted to be triggered by the application of an impulse to said input element, and means inductively coupling to each other said anode element, said grid element, said input element, and said output element, said coupling means including an individual inductor in circuit with each of the coupled elements, said inductors being disposed closely adjacent each other for tight coupling and arranged to produce an increase in the voltage of said grid element in the direction tending to decrease the conductivity of said discharge tube when current flow is increasing in said output element.

2. A circuit of the character described, comprising an electron discharge tube having at least anode, cathode, and grid elements, a blocking oscillator having input and output elements, said oscillator being adapted to be triggered by the application of an impulse to said input element, means connecting said grid element through a winding to a source of impulses, means connecting said anode element through a second winding to a current source, means connecting said output element through a third winding to said current source, and means connecting said input element to a fourth winding, said windings being all disposed closely adjacent each other and thereby tightly inductively coupled to each other and arranged to produce an increase in the voltage of said grid element in the direction tending to decrease the conductivity of said discharge tube when current flow is increasing in said output element.

3. A circuit of the character described, comprising an electron discharge tube having at least anode, cathode, and grid elements, a blocking oscillator having input and output elements, said oscillator being adapted to be triggered by the application of an impulse to said input element, means connecting said grid element through a winding to a source of impulses, means connecting said anode element through a second winding to a current source, means connecting said output element through a third winding to said current source, and means connecting said input element to a fourth winding, said windings being all disposed closely adjacent each other and thereby tightly inductively coupled to each other and arranged to produce in increase in the voltage of said grid element in the direction tending to decrease the conductivity of said discharge tube when current flow is increasing in said output element, and said first and third windings being wound oppositely to said second and fourth windings.

VERNON C. WESTCOTT.

REFERENCES CITED

The following references are of record in the file of this patent:

UNITED STATES PATENTS

| Number | Name | Date |
|---|---|---|
| 1,978,461 | Hoover et al. | Oct. 30, 1934 |
| 2,086,918 | Luck | July 13, 1937 |
| 2,165,770 | Tolson | July 11, 1939 |
| 2,171,536 | Bingley | Sept. 5, 1939 |
| 2,233,596 | Fawdell | Mar. 5, 1941 |
| 2,384,931 | Kessler | Sept. 18, 1945 |

FOREIGN PATENTS

| Number | Country | Date |
|---|---|---|
| 442,686 | Great Britain | Feb. 13, 1936 |